B. B. HILL.
HAND STAMP.
No. 10,506. Reissued Aug. 5, 1884.
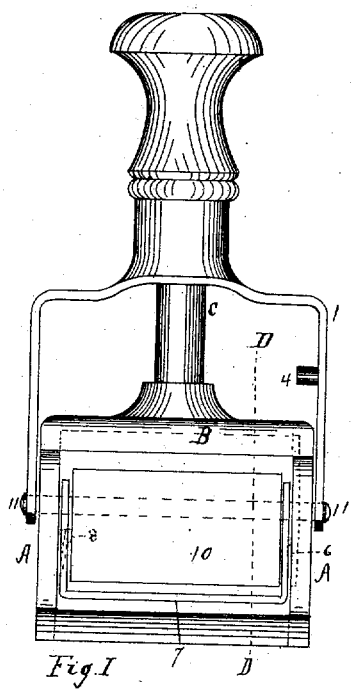
Fig. I
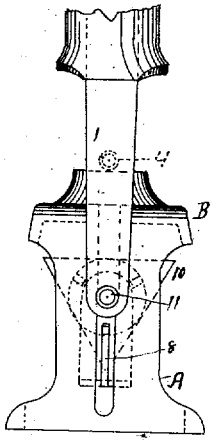
Fig. II
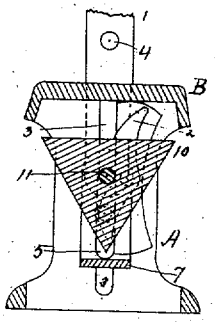
Fig. III
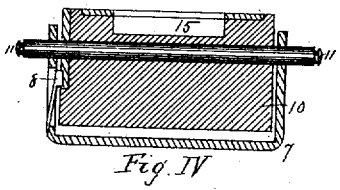
Fig. IV
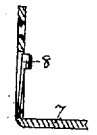
Fig. VIII
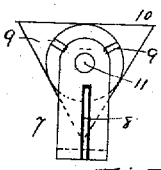
Fig VI
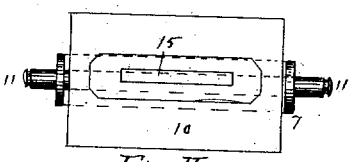
Fig. V
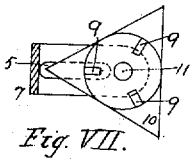
Fig. VII.
WITNESSES:
W. S. Robertson
Wm Turner.
INVENTOR
Benjamin B. Hill
BY T. J. W. Robertson
ATTORNEY.
N. PETERS. Photo-Lithographer, Washington, D. C.

UNITED STATES PATENT OFFICE.

BENJAMIN B. HILL, OF PHILADELPHIA, PENNSYLVANIA.

HAND-STAMP.

SPECIFICATION forming part of Reissued Letters Patent No. 10,506, dated August 5, 1884.

Original No. 261,229, dated July 18, 1882. Application for reissue filed January 11, 1884.

*To all whom it may concern:*

Be it known that I, BENJAMIN B. HILL, formerly of Springfield, in the county of Hampden and State of Massachusetts, but now of Philadelphia, in the county of Philadelphia and State of Pennsylvania, have invented certain new and useful Improvements in Self-Inking Hand-Stamps, of which the following is a specification and description.

My invention is an improvement in that class of hand-stamps in which the die-block is adapted to be provided with two or more printing-dies, either one of which may be used to make the impression and be automatically inked therefor at each successive downward and upward movement of the hand-piece in the ordinary operation of printing with the stamp; and it consists in such a construction of the die-block and its appendages that said die-block can be turned independently of the guide used for holding the die-block while it is moving downward in the main frame to give the impression, as will be more fully hereinafter described, and illustrated in the accompanying drawings, in which—

Figure I is a front view of a self-inking hand-stamp having my invention applied. Fig. II is an end view of the same. Fig. III is a vertical transverse section of the stamp through the inking-bed and parts below on the line D D of Fig. I. Fig. IV is a vertical longitudinal section of the die-block and its reversing-guide with the pivot connecting the two in elevation. Fig. V is a plan of the same parts. Fig. VI is an end view of the die-block and its reversing-guide. Fig. VII is a transverse section through the reversing-guide, showing the end of the die-block in a partially-reversed position, as in the act of turning in the operation of printing; and Fig. VIII is a longitudinal vertical section of one end of the reversing-guide, showing the spring-catch which retains the die-block in its desired position in the guide.

In the drawings, A denotes the stationary frame of an ordinary self-inking hand-stamp; C, the tube containing the actuating-spring; 1, the movable frame with the hand-piece secured to its upper portion and ordinarily a die-plate pivoted in the lower end of the movable frame. Instead, however, of the ordinary die-plate used, I pivot what might more properly be termed a "die-block," as 10, in the lower end of the movable frame, having any desired number of sides, each adapted to have a die secured thereto or made thereon.

In the drawings a die-block having three sides is shown which is provided with a journal-bearing, as 11, at each end, preferably equidistant from the sides of the block, and which journal-bearing may be continuous, extending the entire length of the block, as shown in Fig. IV, and the ends of this pivot or journal may be grooved to receive a spring-ring at each end after being inserted into place.

In place of the ordinary guide usually employed with this class of stamps to reverse the position of the die while in operation, which guide is fixedly attached to or formed with the die block or plate, I use a movable guide or yoke, 7, which is so connected to the die-block that the latter can be moved independently of the guide when it is desired to substitute another face of the die-block for the one in use.

The guide or yoke 7 is shown as pivoted upon the journal, or is attached thereto at one end, and extends around the block 10 to its other end, and is there pivoted or attached to that end of the journal; and this yoke is provided with a longitudinal slot, as 5, at one end, and at the other is provided with a spring catch or detent, as 8, whose end projects inward toward the die-block and engages with any one of a series of indents, as 9, made in the end of said die-block, the number of said indents being equal to the number of sides of the block having dies attached.

One end of the stationary frame A is provided with a vertical slot, as 3, and a bar, as 2, is pivoted midway its length to the inside of said frame by the side of this slot with a pin, 6, projecting inward from the lower portion of said bar and into the slot 5 in the yoke 7.

The lower ends of the movable frame 1 are pivoted to the journals 11 of the die-block, and a pin, as 4, projects inward from the upper portion of the movable frame 1, which, when the said frame is moved down, passes down in the slot 3 in the stationary frame A, and against the inner curved edge of the vibrating bar 2. As the movable or actuating frame 1 moves down, the journal 11 at one end of the die-block first strikes against the inner edge of the lower part of the vibrating bar 2, moving the lower end of the latter outward, and as the pin in the lower end of the vibrating bar projects into the slot 5 in the yoke 7, at a point quite near to the journal 11, the main part of the yoke is moved to one side or partially turned upon the journals 11, partially turning the die-block also, which is held fast to the yoke. The die-block being thus turned somewhat more than one-fourth of a revolution, as the actuating-frame 1 is moved farther down, the pin 4 in the upper part of said frame strikes against the curved inner edge of the upper end of the vibrating bar 2, moving its upper end outward and its lower end and projecting pin inward, and causing the yoke and the die-block, held fast by the detent 8, to make a a full half-turn upon the journals 11, when the die-block will be in a reversed position from that which it occupied when the actuating-frame was in its most elevated position, and the die will, in this lower and reversed position, make an impression upon any material placed beneath to receive it. In the upward movement of the actuating-frame 1, the journal 11 at the end of the die-block first strikes against the inner-curved edge of the lower end of the vibrating bar, and moving its projecting pin and the yoke to one side, and causing the latter and the die-block to partially turn back again on the journals 11, and as the frame and journals 11 move upward, one end of the latter strikes against the inner curved edge of the vibrating bar at its upper end and throws it outward, and its lower end and its projecting pin inward, causing the die-block to make a full half-turn backward, and resuming its original position before it was moved down. When in this elevated position, the same die which made the impression at the last downward movement of the frame 1 will be held by the frame up against the inking-pad located and exposed in the lower side of the part B of the stationary frame A, and will thereby receive the ink necessary for making the next impression at the next downward movement of the hand-piece and actuating-frame 1. Any one of the dies of the three on the three-faced die-block 10 may thus be used for making successive impressions, and if any one of the dies is being used, and it is desired to use one of the others, the block 10 may be rotated upon the journals 11, springing the detent 8 out of its recess, and when the desired die is exposed for use, or in a position opposite the yoke 7, the detent 8 will then spring into the appropriate recess, as 9, and the die-block be held in the same position until it is again turned with the fingers to expose the desired die.

In the illustration a die-block is shown having three faces, to each of which a die may be secured different in its character or printing-matter from either of the others; but it is obvious that a die-block having any desired number of faces may be used, each having a die different in character or matter from the others, which is oftentimes a matter of no little convenience.

I am aware that stamps having four-sided die-blocks have been proposed, the faces of which were intended to be used in the same manner as mine; but in this case there were as many reversing-guides as there were faces to the die, and the die-block and guides were permanently fastened together, while in my improvement there is but one guide, and the die-block can be moved independently of the guide, so as to bring either face of the die into operation as required.

It is evident that the desired number of detents may be made in the end of the die-block and arranged to engage in an indent made in the inside of the guide 7, if desired; but I prefer the construction hereinbefore described.

If it is desired to have more than one die-block, the journal may be disengaged from its bearings in the lower end of the frame 1, the die-block thereon removed from the journal and another slipped onto the journal, and the latter again secured in its bearings in the frame, all with very little trouble. In this manner a great variety of printing may be done with one stamp by having the desired variety of die-blocks, one being removed and another being substituted when desired.

One or more of the faces of the die-block may have a recess, as 15, therein, in which to insert type to be used for dating purposes in connection with the permanent die made thereon or secured thereto.

Having thus described my invention, what I claim as new is—

1. The combination, in a self-inking stamp, of a die-block having a number of sides, each of which may be brought into action as the printing-surface, and a guide for controlling the position of the printing-surface while giving the impression, the two being adjustably connected and constructed, substantially as described, to move together while giving the impression, and to allow the die-block to move independently of the guide when desired, to bring a different printing-surface into action, as set forth.

2. In a hand-stamp, the combination of a fixed frame provided with an inking-pad exposed on its lower side, an actuating-frame, a revolving die-block having a number of sides, as described, and pivoted upon journals having a bearing in said actuating-frame, an oscillating yoke loosely embracing the ends of said die-block, and a spring detent or catch mechanism between said yoke and die-block, so that the latter may be revolved in the yoke to bring and retain either of its printing-dies into position to be used for printing, and for having the ink automatically applied for printing by the movement of the actuating-frame in the operation of printing, substantially as described.

BENJAMIN B. HILL.

Witnesses:
WILLIAM S. TOLAND,
CHAS. W. MILLER.